United States Patent
Fritz et al.

(10) Patent No.: US 12,214,605 B2
(45) Date of Patent: Feb. 4, 2025

(54) METHOD FOR OPERATING A COATING SYSTEM, AND CORRESPONDINGLY ADAPTED COATING SYSTEM PRELIMINARY

(71) Applicant: Dürr Systems AG, Bietigheim-Bissingen (DE)

(72) Inventors: Hans-Georg Fritz, Ostfildern (DE); Benjamin Wöhr, Eibensbach (DE); Jerome Lavallée, Albstadt (DE); Moritz Bubek, Ludwigsburg (DE); Timo Beyl, Besigheim (DE); Daniel Tandler, Stuttgart (DE); Tobias Berndt, Ditzingen (DE); Frank Herre, Oberriexingen (DE); Peter Haller, Herrenberg (DE); Steffen Sotzny, Oberstenfeld (DE)

(73) Assignee: Dürr Systems AG, Bietigheim-Bissingen (DE)

( * ) Notice: Subject to any disclaimer, the term of this patent is extended or adjusted under 35 U.S.C. 154(b) by 31 days.

(21) Appl. No.: 18/249,741

(22) PCT Filed: Oct. 12, 2021

(86) PCT No.: PCT/EP2021/078133
§ 371 (c)(1),
(2) Date: Apr. 20, 2023

(87) PCT Pub. No.: WO2022/084099
PCT Pub. Date: Apr. 28, 2022

(65) Prior Publication Data
US 2024/0010017 A1  Jan. 11, 2024

(30) Foreign Application Priority Data
Oct. 22, 2020 (DE) .................... 10 2020 127 852.7

(51) Int. Cl.
*B41J 29/393* (2006.01)
*B05B 13/04* (2006.01)
(Continued)

(52) U.S. Cl.
CPC ......... *B41J 29/393* (2013.01); *B05B 13/0431* (2013.01); *B25J 9/1679* (2013.01); *B25J 11/0075* (2013.01); *B41J 2029/3935* (2013.01)

(58) Field of Classification Search
CPC B41J 29/393; B41J 2029/3935; B25J 9/1679; B25J 11/0075
See application file for complete search history.

(56) References Cited

U.S. PATENT DOCUMENTS

2007/0000442 A1  1/2007  Schucker
2019/0091712 A1  3/2019  Medard et al.
(Continued)

FOREIGN PATENT DOCUMENTS

DE          10048749 A1     4/2002
DE       102007018877    * 10/2008
(Continued)

OTHER PUBLICATIONS

International Search Report and Written Opinion for PCT/EP2021/078133 mailed Feb. 11, 2022 (12 pages; with English translation).
(Continued)

*Primary Examiner* — Nathan T Leong
(74) *Attorney, Agent, or Firm* — Taft Stettinius & Hollister LLP; Thomas E. Bejin; John Wray Carpenter

(57) ABSTRACT

The disclosure relates to an operating method for a coating system (e.g. painting installation) for coating components (e.g. motor vehicle body components). Prior to the actual coating operation, the operating method provides for a testing operation comprising the following:
(Continued)

Specification of a test pattern to be applied to a test surface,

Determination of control signals for controlling the coating system, the control signals being determined from the predetermined test pattern and being intended to control the coating system in operation in such a way that the applicator applies the test pattern to the test surface, controlling the coating system with the control signals so that the coating system applies the test pattern to the test surface with the applicator, recording an image of the test pattern applied to the test surface by means of a sensor, determining a deviation between the predetermined test pattern and the recorded image of the actually applied test pattern, and determining correction values for the control signals depending on the deviation between the predetermined test pattern and the recorded image of the actually applied test pattern.

26 Claims, 9 Drawing Sheets

(51) Int. Cl.
*B25J 9/16* (2006.01)
*B25J 11/00* (2006.01)

(56) References Cited

U.S. PATENT DOCUMENTS

| | | |
|---|---|---|
| 2019/0299231 A1 | 10/2019 | Fritz et al. |
| 2019/0308211 A1 | 10/2019 | Fritz et al. |
| 2019/0308212 A1 | 10/2019 | Fritz et al. |
| 2019/0314847 A1 | 10/2019 | Fritz et al. |
| 2019/0336990 A1 | 11/2019 | Fritz et al. |
| 2019/0337001 A1 | 11/2019 | Fritz et al. |
| 2019/0337005 A1 | 11/2019 | Fritz et al. |
| 2019/0337006 A1 | 11/2019 | Fritz et al. |
| 2019/0337311 A1 | 11/2019 | Fritz et al. |
| 2020/0078813 A1 | 3/2020 | Fritz et al. |
| 2020/0094282 A1 | 3/2020 | Fritz et al. |
| 2020/0130004 A1 | 4/2020 | Le Strat |
| 2022/0237064 A1 | 7/2022 | Alt et al. |
| 2022/0266285 A1 | 8/2022 | Fritz et al. |

FOREIGN PATENT DOCUMENTS

| | | |
|---|---|---|
| DE | 102007018877 A1 | 10/2008 |
| DE | 102016014919 A1 | 6/2018 |
| DE | 102016014920 A1 | 6/2018 |
| DE | 102016014943 A1 | 6/2018 |
| DE | 102016014944 A1 | 6/2018 |
| DE | 102016014946 A1 | 6/2018 |
| DE | 102016014947 A1 | 6/2018 |
| DE | 102016014948 A1 | 6/2018 |
| DE | 102016014951 A1 | 6/2018 |
| DE | 102016014952 A1 | 6/2018 |
| DE | 102016014953 A1 | 6/2018 |
| DE | 102016014955 A1 | 6/2018 |
| DE | 102016014956 A1 | 6/2018 |
| DE | 102019112099 B3 | 6/2020 |
| EP | 3213823 A1 | 9/2017 |
| EP | 3643409 A1 | 4/2020 |

OTHER PUBLICATIONS

DIN German Institute for Standardization e. V.; Quality management systems—Requirements (ISO 9001:2015); German and English version EN ISO 9001:2015.

* cited by examiner

| Nozzle no.: | 1 | 2 | 3 | 4 | 5 | 6 | 7 | 8 | 9 | 10 | 11 | 12 | 13 |
|---|---|---|---|---|---|---|---|---|---|---|---|---|---|
| Correction value $\Delta t_0$ start [ms] | 0 | 0 | 0 | 100 | 200 | 0 | 0 | -100 | -200 | 0 | 100 | 100 | 0 |
| Correction value $\Delta t_0$ Ende [ms] | 0 | 0 | -100 | 0 | 0 | -200 | -100 | 0 | 0 | 100 | -100 | 100 | 0 |
| Braking parameter | 0 | 0 | 0 | 0 | 0 | 0 | 0 | 0 | 0 | 0 | 0 | 0 | 1 |

Fig. 8

METHOD FOR OPERATING A COATING SYSTEM, AND CORRESPONDINGLY ADAPTED COATING SYSTEM PRELIMINARY

CROSS-REFERENCE TO RELATED APPLICATIONS

This application is a national stage of, and claims priority to, Patent Cooperation Treaty Application No. PCT/EP2021/078133, filed on Oct. 12, 2021, which application claims priority to German Application No. 10 2020 127 852.7, filed on Oct. 22, 2020, which applications are hereby incorporated herein by reference in their entireties.

FIELD

The disclosure relates to an operating method for a coating system (e.g. painting installation) for coating components (e.g. motor vehicle body components) by means of an applicator (e.g. print head) guided by a coating robot. Furthermore, the disclosure relates to a correspondingly adapted coating system. In particular, the disclosure relates to coating methods in which no or little overspray is generated and to coating systems that use application systems that generate little or no overspray.

BACKGROUND

In modern painting installations for painting motor vehicle body components, the motor vehicle body components to be painted are usually conveyed through the painting installation along a painting line and painted in several successive painting stations. At the end of the painting line, a quality control is usually carried out to monitor the quality of the applied paint. This quality control can be performed visually by humans or by means of camera-based systems that use a combination of a camera and a strip light projector.

A disadvantage of this known type of quality inspection is the fact that the quality inspection only takes place at the end of the painting line, so that in the event of a recurring defect, a large number of vehicle body components may be affected by the defect and then require costly rectification.

The use of automated systems for quality control also incurs additional investment costs, which is also disadvantageous.

With regard to the state of the art, reference should also be made to DE 100 48 749 A1. However, this publication relates to a completely different principle for quality inspection. In this case, the quality inspection takes place during the actual coating operation, i.e. the testing operation and the coating operation coincide in time and take place in parallel.

Finally, with regard to the technical background of the disclosure, reference should also be made to the technical standard DIN EN ISO 9001:2015 "Quality management systems—Requirements".

BRIEF DESCRIPTION OF THE DRAWINGS

FIG. 8 shows an exemplary table containing the correction values of the values determined in FIG. 7.

DETAILED DESCRIPTION

Figure 1:
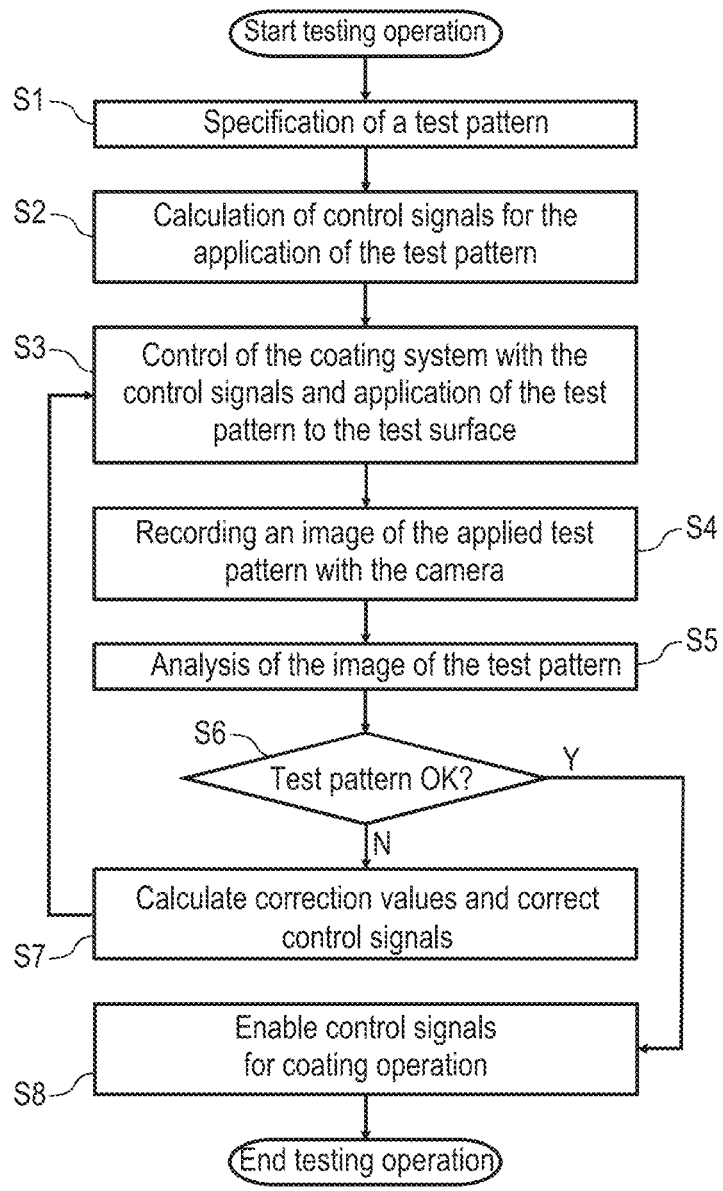
FIG. 1 a flow chart illustrating the testing operation of the operating method according to the disclosure, FIG. 2 a flow chart illustrating the actual coating operation which follows the testing operation, FIG. 3 a schematic representation of a coating system according to the disclosure, FIG. 4 a schematic diagram illustrating the possibilities for testing defects and correcting them with a test pattern.

The disclosure is based on the task of improving quality control in a coating system.

This task is solved by an operating method for a coating system according to the disclosure and by a correspondingly adapted coating system according to the disclosure.

The disclosure also includes, in addition to the actual coating operation for coating the components (e.g. motor vehicle body components), a testing operation for quality assurance. The testing operation on the one hand and the coating operation on the other hand are thus preferably separate from one another, for example in terms of time.

In the operating method according to the disclosure, the testing operation comprises several steps which are carried out in succession, the individual steps being initially described only briefly below in order to enable a basic understanding of the disclosure.

In a first operation, a test pattern is first specified to be applied to a test surface. For example, the test pattern may be provided as a graphic in file form in a common graphic format. In general, the test pattern can be a graphic, a surface or a partial surface of an object or also a surface filled with a pattern with a continuous border. Furthermore, within the scope of the disclosure, it is also possible for the test pattern to be a barcode or a QR code.

The test surface can be, for example, a hidden area on the component to be coated (e.g. motor vehicle body component) or the surface of a separate part (e.g. paper tape from a paper roll), as will be described in detail below.

In a further step, control signals for controlling the coating system are then determined, the control signals being determined from the predetermined test pattern and being intended to control the coating system in operation so that the applicator applies the test pattern to the test surface. The control signals preferably comprise various signals which serve to control the coating robot, the applicator and/or other components (e.g. conveyor system, paint supply) of the coating system, as will also be described in detail. For example, the control signals can define switching times of coating agent valves, whereby the switching times determine at which point on the component surface a coating agent jet is to be switched on or off.

In a further step, the coating system is then controlled with the previously determined control signals so that the coating system applies the specified test pattern to the test surface. In a completely error-free operation, the applied test pattern matches the specified test pattern perfectly, but this is hardly possible. In practice, however, more or less large deviations occur between the specified test pattern and the test pattern actually applied.

Subsequently, an image of the test pattern applied to the test surface is recorded by a sensor, which may be a camera, for example.

In the next operation, the deviation between the predetermined test pattern on the one hand and the recorded image of the actually applied test pattern on the other hand is then determined. These deviations between the predefined test pattern on the one hand and the recorded image of the actually applied test pattern on the other hand can be, for example, splashes, dropouts, gaps between adjacent coating agent paths, switching on the applicator too early or switching off the applicator too early, whereby the various error cases are still described in detail.

Depending on the deviation determined in this way between the specified test pattern on the one hand and the recorded image of the actually applied test pattern on the other, correction values are then determined for the control signals. If, for example, the error is that the applicator is switched on too early, the correction value consists of a time delay of the switch-on point.

Based on the detected deviations (e.g. splashes, dropouts=missing coating) between the specified test pattern on the one hand and the recorded image of the actually applied test pattern on the other hand, the control system can also initiate a cleaning of the applicator or a rinsing process. Afterwards, the application of the test pattern can be performed again. As a result of the evaluation of the test pattern, the control system can also abort the licking process.

In addition to the testing operation described above, the operating method according to the disclosure preferably also comprises a coating operation, which follows the testing operation in terms of time and also comprises several steps, which are described briefly below.

Thus, in the coating operation, a coating program for coating the components (e.g. motor vehicle body components) is first specified, such coating programs being sufficiently known from the prior art and therefore not needing to be described separately. For example, such coating programs can be "taught" by the operator of a paint shop, as is sufficiently known from the prior art.

Control signals are then derived from the specified coating program, which are used to control the coating system. For example, the control signals can be used to control the applicator and the coating robot. In practice, however, the control signals also include signals for controlling other components of the coating system, such as the conveyor system and the paint supply system.

The control signals determined from the coating program are then corrected according to the correction values previously determined in the preceding testing operation.

The coating system is then controlled in the coating operation using the corrected control signals. If, for example, the applicator is switched on with an undesired delay (i.e. too late) when a coating path is being coated, the correction values ensure that the applicator is switched on at the correct time in the actual coating operation.

The term applicator as used in the context of the disclosure is to be understood in a general sense and is not limited to a particular type of applicator.

For example, the applicator may be an atomizer (e.g., rotary atomizer, air atomizer, air-mix atomizer, airless atomizer) that delivers a spatially extended spray of the coating agent. Such atomizers are known from the prior art and therefore need not be described in detail.

However, in a preferred embodiment of the disclosure, the applicator is a nozzle applicator comprising a plurality of nozzles, each of which delivers a jet of coating agent. For example, such a nozzle applicator may have more than 5, 10 or more than 20 nozzles. It should be mentioned here that the individual nozzles of the nozzle applicator in the preferred embodiment of the disclosure can be controlled independently of each other, i.e. the coating agent jets from the individual nozzles can be switched on or off independently of each other. Furthermore, it should be mentioned that the individual coating agent jets can be coherent in the jet direction or can consist of several separate coating agent droplets which are separated from each other in the longitudinal direction of the jet. It should also be mentioned that the individual coating agent jets from the nozzles of the nozzle applicator are preferably aligned parallel to each other. Such a nozzle applicator usually differs from an atomizer by a relatively small jet widening angle of the individual coating agent jets, whereby the jet widening angle can be smaller than 30°, 20°, 10°, 5° or 2°. An advantage of such nozzle applicators is the substantially greater application efficiency compared to atomizers, so that the nozzle applicator can operate essentially overspray-free, for example with an application efficiency of at least 90%, 95% or even at least 98%. Such nozzle applicators are used in modern painting systems for over-spray-free painting and are also referred to there as pressure heads. The design and operation of such print heads are known per se from numerous earlier patent applications, such as DE 10 2016 014 956 A1 (equivalent to US2019/0337001 A1), DE 10 2016 014 946 A1 (equivalent to US2019/0337005 A1), DE 10 2016 014 948 A1 (equivalent to US2019/0308212 A1), DE 10 2016 014 953 A1 (equivalent to US2022/0266285 A1), DE 10 2016 014 919 A1 (equivalent to US2019/0299231 A1), DE 10 2016 014 947 A1 (equivalent to US2019/0336990 A1), DE 10 2016 014 951 A1 (equivalent to US2019/0308211 A1), DE 10 2016 014 952 A1 (equivalent to US2020/0078813 A1), DE 10 2016 014 955 A1 (equivalent to US2019/0337006 A1), DE 10 2016 014 944 A1 (US equivalent to US2020/0094282 A1, DE 10 2016 014 943 A1 (equivalent to US2019/0314847 A1), and DE 10 2016 014 920 A1 (equivalent to US2019/0337311 A1). The contents of these earlier patent applications are therefore to be fully attributed to the present description with regard to the construction and operation of the print heads.

Furthermore, it should be mentioned that the disclosure is not limited to a particular type of coating agent with respect to the coating agent. For example, the coating agent may be a paint, which may be water-based or solvent-based. Further, the coating agent (e.g., paint) may be a 1K coating agent or a 2K coating agent. In this context, it should also be mentioned that the coating agent may be, for example, an adhesive, a UV coating, a bonding agent, a primer or pasty materials, sealants or insulating materials, to name just a few examples.

It has already been described above that correction values for the control signals for controlling the coating system are determined during the testing operation. These correction values preferably relate to the control of the applicator.

For example, the control signals can define switching times for switching the applicator on and off, in particular individually for the individual nozzles of the nozzle applicator. The correction values can then define, for example, a positive or negative switching delay so that the nozzles are switched on or off as precisely as possible at the specified switching time in real coating operation. It should also be mentioned here that the correction values can be defined individually for the individual nozzles of the nozzle applicator. In the case of a nozzle applicator with ten nozzles, for example, a correction value can be defined for each of the nozzles. The correction values for the individual nozzles can be different and, for example, compensate for component scattering of the associated nozzle valves.

However, the correction values determined during the testing operation can also affect the control of the coating robot. Here it is to be mentioned that the correction values preferably concern both the control of the applicator and the control of the coating robot. However, the disclosure also claims protection for such variants of the disclosure in which the correction values relate only to the control of the applicator or only to the control of the coating robot.

For example, the correction values for the individual path points of a coating path can define a change in the spatial position and/or the spatial orientation of the applicator. For example, common coating programs usually define coating paths to be traversed by the paint impingement point of the applicator used, with the coating paths being specified by a number of path points as support points. The spatial position and/or the spatial orientation of the applicator can then be specified in the individual path points. The correction values can then define a change in the spatial position and/or the spatial orientation of the applicator at the respective path point.

It has already been briefly mentioned above that the test surface can be located on the component to be coated. However, the application of the test pattern to the test surface then leads to an actually undesirable coating on the component. However, this is not a nuisance if the test surface is located at a concealed point on the component to be coated that cannot be seen during normal operation.

Alternatively, it is possible for the test surface on the component to be coated to be painted over during actual coating operation, so that the test pattern is then no longer visible and therefore does not interfere.

Alternatively, it is also possible for the test surface on the component to be coated to be located at a point that is covered by an add-on part (e.g. trim panel) or by a built-in part (e.g. dashboard, seat) in the finished state, so that the applied test pattern does not impair the quality impression of the finished coated component, since the test pattern is then covered by the built-in part or the add-on part.

Alternatively, it is also possible that the test surface is not located on the component to be coated, but on a separate test substrate, so that the applied test pattern does not impair the quality appearance of the finished coated component. For example, the test substrate can be a test sheet which is coated with the test pattern during the testing operation and then disposed of. In one variant of the disclosure, the test substrate is such that it can be cleaned after application of the test pattern from the test pattern, for example by wiping the test pattern from the test substrate.

Alternatively, it is possible for the test substrate to be a tape (e.g. paper tape) that is unwound from a tape roll. In this way, several test patterns can be applied one after the other, whereby the tape must be unwound from the tape roll a piece at a time so that the next test pattern can then be applied to the tape.

It has already been briefly mentioned above that, after the test pattern has been applied to the test surface, a sensor records an image of the test pattern applied to the test surface. This sensor can be, for example, a camera that optionally records individual images or videos, whereby the camera can, for example, operate at a frame rate of less than 60 frames per second, 30 frames per second or 10 frames per second.

Furthermore, it is possible to use a stripe light projector to illuminate the test pattern applied to the test surface by projecting a stripe light pattern onto the test surface. Such stripe light projectors are known from the prior art and therefore need not be described separately.

The sensor can also be a combination device of a strip light projector and a camera.

In a particular embodiment of the disclosure, the sensor is also used for other tasks, such as detecting the position of an object in three-dimensional space. The sensor can be mounted on the robot for this purpose, e.g. on a hand axis. Thus, the testing operation according to the disclosure does not necessarily require an additional sensor. Rather, a sensor that is present anyway and is used, for example, in the coating operation can also be used for the testing operation.

The analysis of the image of the test pattern applied to the test surface taken by the sensor (e.g., camera) also makes it possible to detect malfunctions of the applicator, which in the case of a nozzle applicator is possible individually for the individual nozzles of the applicator. For example, the following malfunctions of the applicator can be detected as part of this analysis of the image of the test pattern:

Opening the nozzles of the nozzle applicator too long,
too short opening of the nozzles of the nozzle applicator,
opening the nozzles of the nozzle applicator too early,
closing the nozzles of the nozzle applicator too early,
too late opening of the nozzles of the nozzle applicator,
too late closing of the nozzles of the nozzle applicator,
disturbing drops on the test surface,
uncoated dropouts on the test surface,
uncoated gaps between adjacent coating lanes
clogging (clogging) of a nozzle.

In the detection of disturbing drops on the test surface, the drop size of the disturbing drops can also be determined by image evaluation within the scope of the disclosure. The correction values can then be determined as a function of the droplet size. Furthermore, a rinsing and/or cleaning process can also be activated when disturbing drops are detected.

Furthermore, within the scope of the disclosure, it is possible to determine from which nozzle of the applicator the disturbing drop was dispensed by evaluating the image of the test pattern. Depending on the drop size of the disturbing drop, the opening time of the nozzle from which the disturbing drop was dispensed can then be corrected. If, for example, the nozzle applicator has ten nozzles and the image evaluation of the test pattern shows that the disturbing drop was dispensed from nozzle no. 4, the opening time for nozzle no. 4 is reduced accordingly in order to prevent disturbing drops from being dispensed from nozzle no. 4 during the subsequent actual coating operation.

It should also be mentioned that the image produced by the sensor (e.g. camera) can comprise the complete test pattern. Here, the deviation between the specified test pattern on the one hand and the recorded image of the test pattern on the other hand is preferably determined as a function of the complete image.

Alternatively, however, it is also possible for the sensor (e.g. camera) to capture an image of only part of the test pattern, for example at the corners and edges of the test pattern. In this case, the deviation between the specified test pattern on the one hand and the captured image of the test pattern on the other hand is also determined only in these parts of the test pattern.

The sensor described above for capturing an image of the test pattern on the test surface also enables the sensor to determine the position and/or orientation of the components to be coated in the coating operation. This can be used in the actual coating operation to adapt the control signals for controlling the coating system.

The operating method according to the disclosure has been described above, namely on the one hand the testing operation according to the disclosure and on the other hand the actual coating operation. However, the disclosure also claims protection for a correspondingly adapted coating system for coating components, which may be, for example, a painting installation for painting motor vehicle body components.

In accordance with the prior art, the coating system according to the disclosure first comprises an applicator for applying a coating agent, which may be, for example, a rotary atomizer or a print head, as already explained at the outset.

Furthermore, in accordance with the prior art, the coating system according to the disclosure comprises a coating robot which moves the applicator in operation over the components to be coated. For example, this may be a multi-axis coating robot having, for example, six or seven robot axes and serial robot kinematics. However, the term coating robot used in the context of the disclosure is to be understood in a general sense and also includes manipulators such as, for example, a linear axis system with two or three axes (X-Y or X-Y-Z) as well as combinations of a multi-axis robot with a linear axis system.

Furthermore, in accordance with the prior art, the coating system according to the disclosure also comprises a sensor (e.g. camera) for checking the quality of the coating applied to the components.

The operation of the coating system is controlled here by a control unit, as is known per se from the prior art, the operation of the control unit being specified by a control program.

Furthermore, it should be mentioned with regard to the coating system that the sensor (e.g. camera) can be connected to the applicator (e.g. print head) and is then moved together with the applicator by the coating robot. Here, the orientation and position of the sensor relative to the applicator are fixed.

It should also be mentioned that the camera used as a sensor has a specific recording area, whereby the recording area of the camera should include the color impact point of the applicator. This may be useful so that the camera can capture the applied test pattern directly during application.

Figure 2:
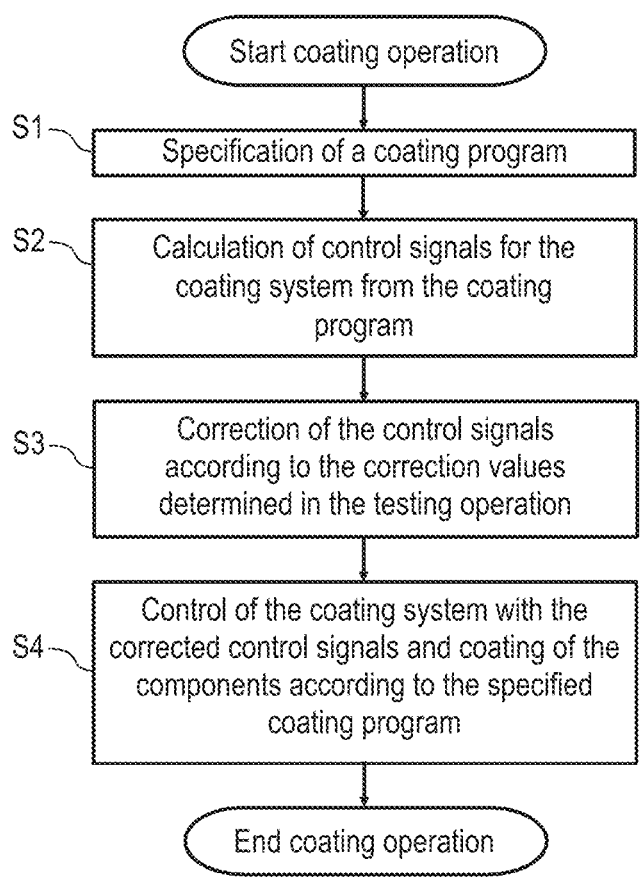

In the flow chart according to FIG. 1 is described, which illustrates the testing operation according to the disclosure, which takes place before the actual coating operation according to FIG. 2.

In a first operation S1, a test pattern is first specified. For example, the test pattern can be a graphic, which is defined in the form of a graphic file in a common graphic format.

In a second operation S2, control signals are calculated which are used to apply the test pattern. The control signals are calculated from the test pattern and are used to control the coating system and in particular the applicator and the coating robot that guides the applicator. For example, the control signals can define switching times of coating agent valves, whereby the switching times determine at which point a coating agent jet is to be switched on or off.

In the next operation S3, the coating system is then controlled with the control signals calculated in this way, so that in the case of completely fault-free operation, the coating system applies the test pattern to a test surface without any faults. The test surface can be, for example, a part of the surface of the component to be coated that cannot be seen, or a separate test substrate, such as a paper tape unwound from a paper roll, as will be described in detail.

In the next operation S4, an image of the applied test pattern is then captured by the attached sensor.

Then, in an operation S5, the recorded image of the test pattern is analyzed to detect deviations between the recorded image of the test pattern on the one hand and the predefined test pattern on the other hand.

If these deviations are within a specified tolerance range, the test pattern is acceptable. In an operation S6, the system then branches off to an operation S8, in which the control signals for the coating operation are enabled, whereby the coating operation is still described in detail.

If, on the other hand, the test in operation S6 shows that the deviations between the predefined test pattern on the one hand and the captured image of the test pattern on the other hand lie outside the tolerance range, the test pattern is not acceptable. In this case, it will be proceeded from operation S6 to operation S7. In operation S7, correction values for the control signals are calculated and the control signals are corrected accordingly.

Then a loop is made back to operation S3. This loop is repeated until the check in operation S6 shows that the test pattern is acceptable or a maximum number of checks is reached.

The corrected control signals are then finally released in operation S8.

In the following, the flow chart according to FIG. 2 will now be described, which explains the actual coating operation that follows the testing operation according to FIG. 1.

In a first operation S1, a coating program is first specified that controls the operation of the coating system. For example, the coating program defines the course of a coating path, which is to be run from the paint impact point of the applicator, whereby the coating path is defined by several path points (support points). The programming ("teaching") of such coating programs is in itself known from the state of the art and therefore need not be described in detail.

In an operation S2, control signals for the control of the coating system are then derived from the control program.

In an operation S3, the control signals are then corrected according to the correction values previously determined in the testing operation. For example, the control signals define switching times for switching on the individual nozzles of the nozzle applicator. The correction values can then define a positive or negative switching delay for the individual nozzles so that the individual nozzles are switched on or off as precisely as possible at the desired positions. Furthermore, the corrections can also directly influence the movement of the applicator and thus adjust the coating path accordingly.

In the next operation S4, the coating system is then controlled with the corrected control signals so that the coating of the components takes place.

Figure 3:
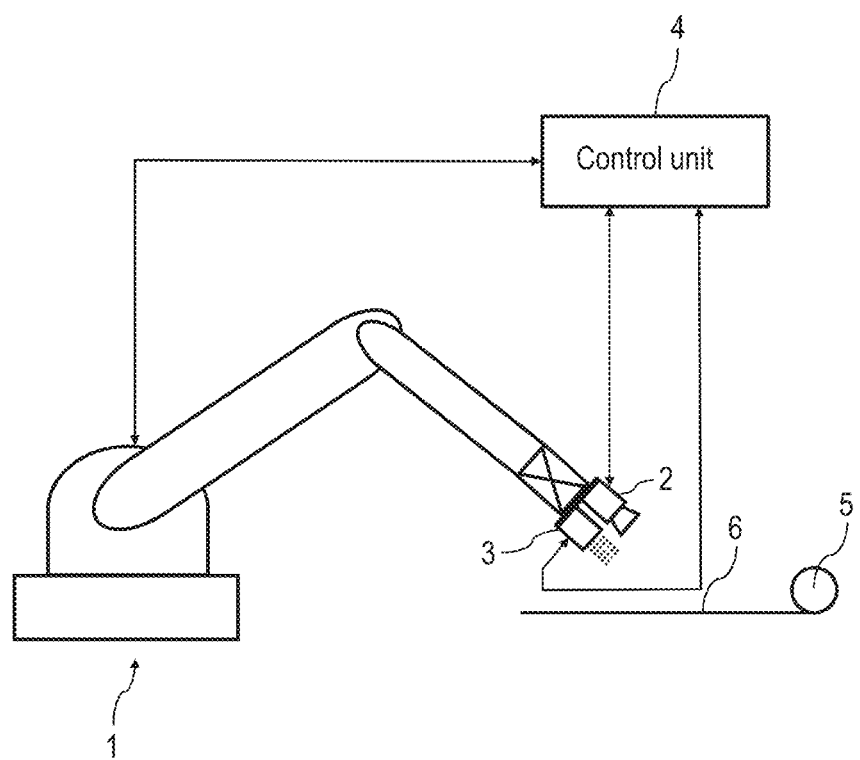

FIG. 3 shows a highly simplified schematic representation of a coating system according to the disclosure, which is largely of conventional design.

The coating system according to the disclosure has a multi-axis coating robot 1 with serial robot kinematics and a multi-axis robot hand axis, the robot hand axis guiding on the one hand a camera 2 and on the other hand a print head 3 as an applicator.

Furthermore, the coating system has a control unit 4 that controls the coating robot 1 according to a predetermined coating program. Furthermore, the control unit 4 is also connected to the print head 3 and controls the switching on and off of the individual nozzles of the print head 3. Furthermore, the control unit 4 is also connected to the camera 2 and thus captures the image taken by the camera 2.

Furthermore, the drawing shows a paper roll 5 from which a paper tape 6 can be unwound. Here, the paper tape 6 forms a test substrate for applying the test pattern as described above with reference to FIG. 1. During the testing operation, the print head 3 thus applies the test pattern to the paper tape 6, with the camera 2 capturing an image of the applied test pattern. The control unit 4 can then analyze the image and calculate correction values for the control signals, as described in detail above.

In the following, the schematic representation in FIG. 4 will be explained, which illustrates the painting of a test pattern consisting of a painting path. A painting path contains at least one activation process of at least one nozzle of the applicator. Furthermore, a painting path contains at least one switch-off process of at least one nozzle of the applicator.

Figure 4:
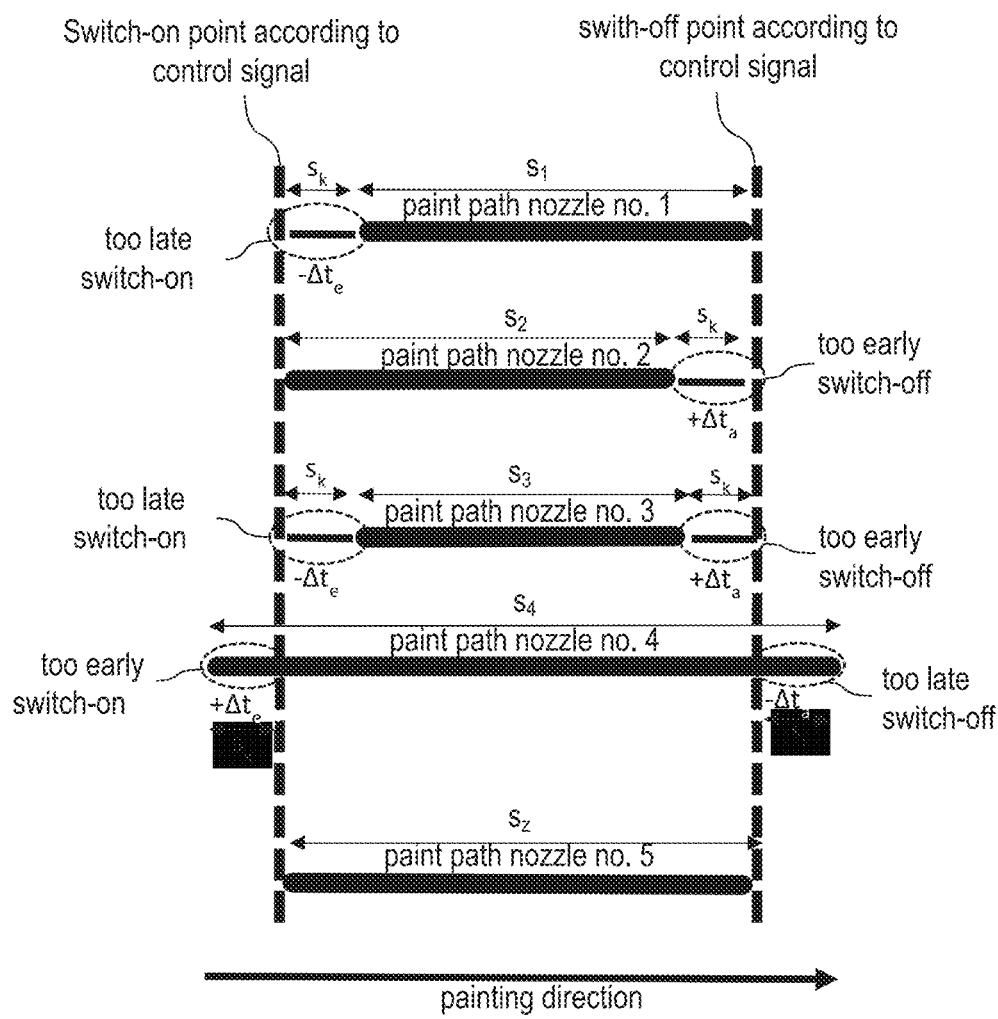
Figure 5A:
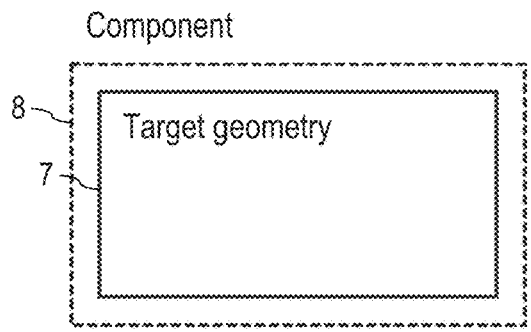
FIGS. 5A-5D various schematic representations illustrating the application of a target geometry to a component surface, and FIGS. 6A-6H schematic representations of various possible defect cases during the application of a target geometry to a component surface.
Figure 5B:
Figure 5C:
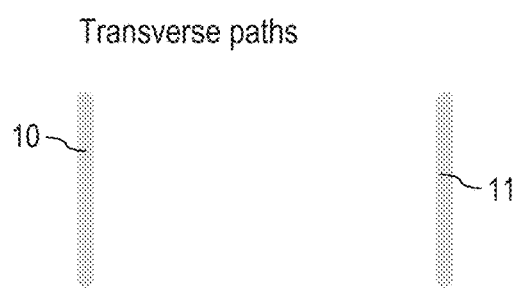
Figure 5D:
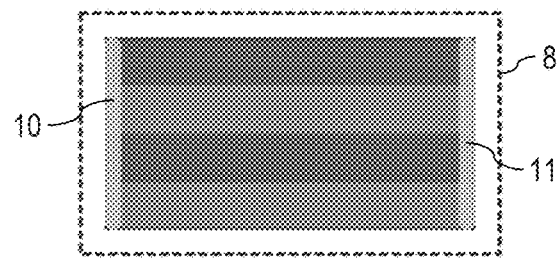

FIG. 4 shows a test pattern in which nozzles No. 1 to No. 5 of the applicator are switched on a painting path. The vertical dashed lines show the switch-on point and the switch-off point of the individual nozzles of the print head according to the uncorrected control signals. When the printhead is moved in the coating direction according to the arrow, the individual nozzles should open when the dotted line on the left is passed and then close again when the next dotted line on the right is passed. In this painting path, deviations from the target switching times can occur, for example, due to component tolerances.

Nozzle No. 1 of the applicator is switched on too late for this painting path in the example, but is switched off at the correct time.

Nozzle No. 2 of the applicator is switched on at the correct time for this painting path, but switched off too early.

Nozzle No. 3 of the applicator is switched on too late and switched off too early for this painting path.

Nozzle No. 4 of the applicator is switched on too early and switched off too late for this painting path.

Only nozzle No. 5 of the applicator is switched on at the correct time and also switched off at the correct time for this painting path.

In the testing operation according to the disclosure, correction signals $-\Delta t_e$, $+\Delta t_e$ for the switch-on times and correction values $-\Delta t_a$, $+\Delta t_a$ for the switch-off times of the nozzles are therefore calculated for the first four nozzles, first as correction distances $s_k$ and then as corresponding time correction values $-\Delta t_e$, $+\Delta t_e$, $-\Delta t_a$, $+\Delta t_a$. Using the known parameters (e.g. traversing speed v of the applicator), switching time differences $-\Delta t_e$, $+\Delta t_e$, $-\Delta t_a$, $+\Delta t_a$ can be calculated from the determined correction distances $s_k$ and stored in a table as correction values for each nozzle. The switch-on point and the switch-off point are corrected according to this correction signal $-\Delta t_e$, $+\Delta t_e$, $-\Delta t_a$, $+\Delta t_a$, so that in the actual coating operation the nozzles are opened or closed at the correct time.

The following applies here:
s=distance between coating start and coating stop of the respective nozzle
sz=desired distance
s1, s2, s3, s4=real line length
$s_k$=correction distance which must be corrected
$+\Delta t_e$=correction due to later switch-on time
$-\Delta t_e$=correction due to earlier switch-on time
$+\Delta t_a$=correction due to later switch-off time
$-\Delta t_a$=correction due to earlier switch-off time
v Coating speed
Example with v=800 mm/s and s=0.2 mm⇒Δt=0.25 ms
FIGS. 5A-5D illustrate the application of a target geometry 7, which lies on a component 8 to be coated.

To apply the application to the target geometry 7, application paths 9 are applied with a number N (three in the example) nozzles in each case, whereby the application paths are adjacent to one another and are to form a continuous coating agent film in the finished state.

In addition, transverse paths 10, 11 are applied at the ends of the application paths 9 to complete the application of the target geometry 7.

FIGS. 6A-6H now show various possible defect cases which can be detected and compensated for in the testing operation according to the disclosure by calculating corresponding correction values for the control signals.

Figure 6A:
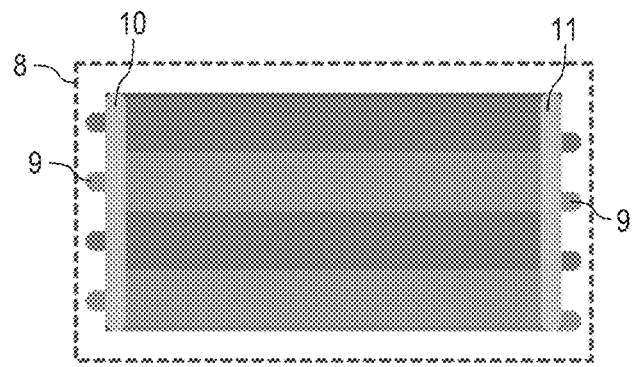

In the case of the error shown in FIG. 6A, the application paths 9 start too early and end too late, i.e. the switch-on time of the individual nozzles is too early and the switch-off time is too late.

Figure 6B:
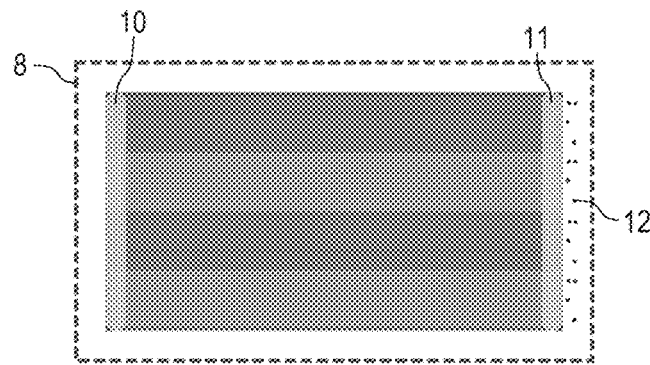

In the case of the error shown in FIG. 6B, interfering splashes 12 occur at the edge of the application.

Figure 6C:
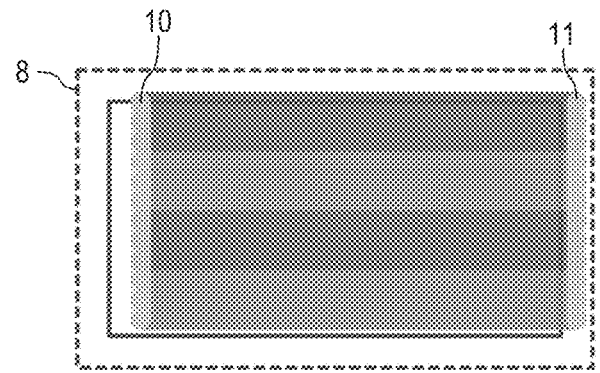

In the case of the error shown in FIG. 6C, the application is offset from the target geometry 7.

Figure 6D:
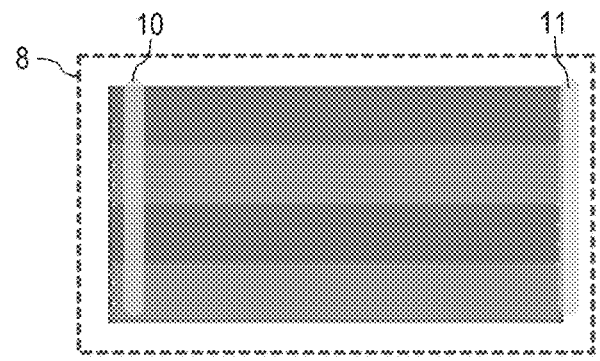

In the case of the defect shown in FIG. 6D, only the transverse paths 10, 11 are offset relative to the target geometry 7.

Figure 6E:
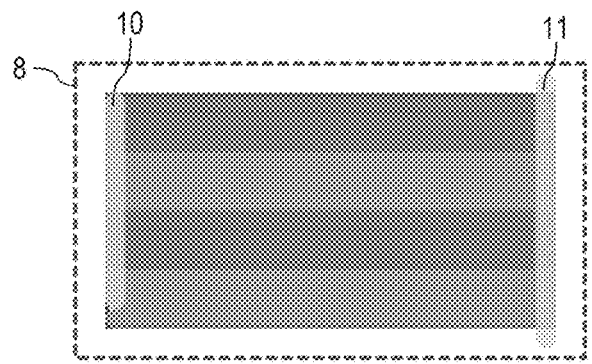

In the error case according to FIG. 6E, the transverse paths 10, 11 are too short or too long.

Figure 6F:
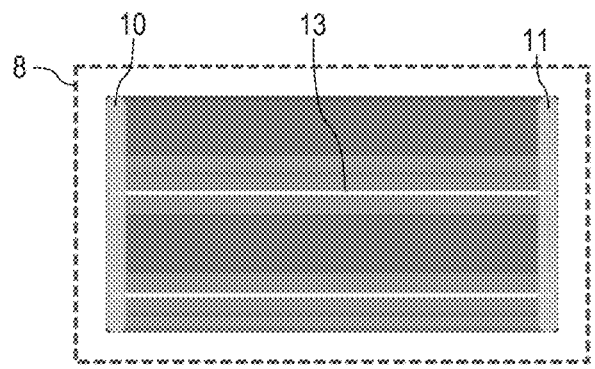

In the case of the error according to FIG. 6F, gaps 13 occur between the adjacent application paths 9.

Figure 6G:
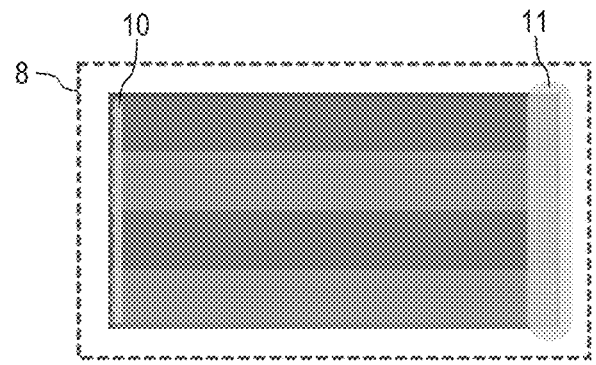

In the defect case according to FIG. 6G, the transverse path 10 is too thin, while the transverse path 11 is too thick.

Figure 6H:
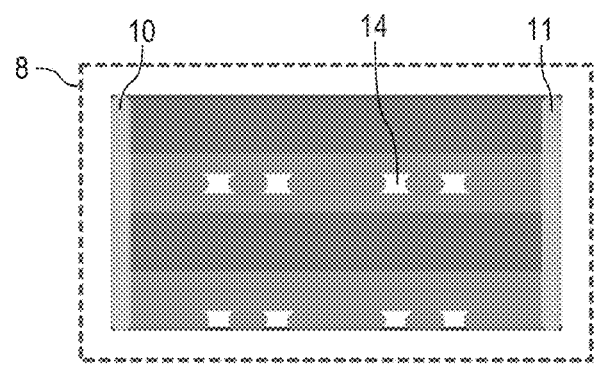

In the case of the defect shown in FIG. 6H, dropouts 14 occur within the application paths 9.

Within the scope of the testing operation according to the disclosure, compensations for the defect cases according to FIGS. 6A-6H can be calculated so that they no longer appear in the application.

Figure 7:
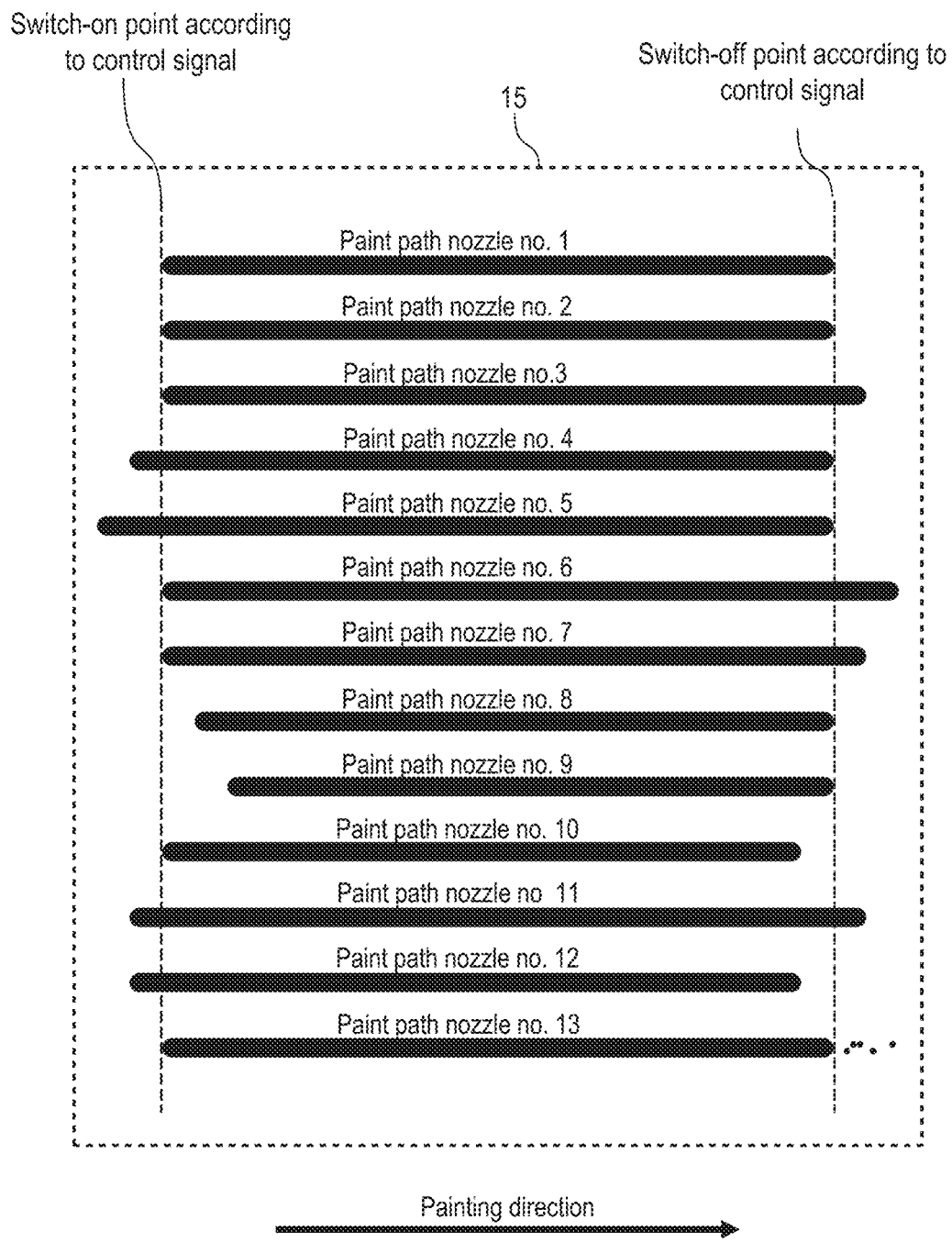
FIG. 7 a schematic representation of the sensor field of view with applied test pattern and resulting corrections.

FIG. 7 shows a modification of FIG. 4 for an applicator with 13 nozzles. To avoid repetition, please refer to the description of FIG. 4.

In addition to FIG. 4, FIG. 7 also shows a camera field of view 15 that is captured by the camera during testing operation.

The table in FIG. 8 shows the associated time correction values $\pm\Delta t_e$, $\pm\Delta t_a$ for the control of the individual nozzles of the applicator for the testing operation according to FIG. 7.

The disclosure is not limited to the preferred embodiment described above. Rather, the disclosure also claims protection for the subject matter and the features of the dependent claims independently of the respective claims referred to and, in particular, also without the features of the main claim. The disclosure thus comprises different aspects of the disclosure which enjoy protection independently of each other. For example, the disclosure also claims protection for the coating operation independently of the testing operation.

The invention claimed is:

1. A method for coating components, the method comprising:
performing a testing operation for quality assurance, wherein the testing operation comprises:
a) specifying a test pattern to be applied to a test surface,
b) determining control signals for controlling a coating system with an applicator guided by a coating robot, wherein the control signals
b1) are determined from the predetermined test pattern, and
b2) are intended to control the coating system in operation in such a way that the applicator applies the test pattern to the test surface,
c) applying the test pattern with the applicator to the test surface by controlling the coating system with the control signals,
d) recording an image of the test pattern applied to the test surface by means of a sensor, e) determining a deviation between the predetermined test pattern and the recorded image of the actually applied test pattern, and f) determining correction values for the control signals as a function of the deviation between the predetermined test pattern and the recorded image of the actually applied test pattern, and g) wherein individual coating agent jets either consist of separate coating agent droplets or are coherent in the jet direction.

2. The method according to claim 1, further comprising a coating operation after the testing operation comprising:

a) presetting a coating program for coating the components, b) determination of control signals for controlling the coating system in accordance with the predetermined coating program, c) correction of the control signals for the coating operation according to the correction values determined in the preceding testing operation, and d) driving the coating system with the corrected control signals.

3. The method according to claim 1, wherein a) the applicator for applying the test pattern has a plurality of nozzles, and b) the applicator emits a coating agent jet from each of the individual nozzles, and c) the individual nozzles of the applicator can be controlled independently of one another, and d) the individual coating agent jets are aligned parallel to one another, and e) the individual coating agent jets each have a jet expansion angle of less than 30°, and f) the applicator operates essentially without overspray, and h) the applicator is a print head.

4. The method according to claim 1, wherein the correction values relate to the control of the applicator.

5. The method according to claim 4, wherein a) the control signals define switching times for switching the applicator on or off, and b) the correction values define a positive or negative switching delay.

6. The method according to claim 5, wherein the control signals define the switching times for switching the applicator on or off individually for the individual nozzles of the applicator.

7. The method according to claim 4, wherein a) the control signals define switch-on periods during which the applicator is switched on, and b) the correction values define a positive or negative change in the switch-on period of the applicator.

8. The method according to claim 7, wherein the control signals define the switch-on period for switching the applicator on individually for the individual nozzles of the applicator.

9. The method according to claim 1, wherein the correction values relate to the control of the coating robot.

10. The method according to claim 9, wherein the correction values for a path point of a coating path define a change in at least one of the spatial position and the spatial orientation of the applicator.

11. The method according to claim 1, wherein at least one of the following actions is carried out as a function of the determined deviation:

a) Rinsing the applicator with a rinsing agent, b) cleaning of the applicator on its outside, c) stopping the coating operation.

12. The method according to claim 1, wherein a) the test surface is located on the component to be coated, b) the test surface on the component to be coated is located at a point which, in the finished state, is concealed by an add-on part or by an installation part, so that the applied test pattern does not impair the impression of quality of the finished coated component.

13. The method according to claim 1, wherein the test surface is not located on the component to be coated, but on a separate test substrate, so that the applied test pattern does not impair the quality appearance of the finished coated component.

14. The method according to claim 13, wherein the separate test substrate can be cleaned from the test pattern by wiping the test pattern from the test substrate.

15. The method according to claim 13, wherein the separate test substrate is a tape.

16. The method according to claim 15, wherein the tape is unwound from a tape role.

17. The method according to claim 1, wherein the sensor has a camera for determining the test pattern applied to the test surface.

18. The method according to claim 17, wherein the camera records individual images.

19. The method according to claim 17, wherein the camera records videos.

20. The method according to claim 1, wherein the image of the test pattern applied to the test surface is analyzed, any malfunctions of the applicator being detected.

21. The method according to claim 20, wherein the malfunctions are detected individually for the individual nozzles of the applicator.

22. The method according to claim 21, wherein at least one of the following malfunctions of the applicator is detected during the analysis of the image of the test pattern:

a) opening of the nozzles of the applicator for too long, b) opening of the nozzles of the applicator too short, c) opening of the nozzles of the applicator too early, d) too early closing of the nozzles of the applicator, e) too late opening of the nozzles of the applicator, f) too late closing of the nozzles of the applicator, g) disturbing drops on the test surface, h) uncoated dropouts on the test surface, i) uncoated gaps between adjacent coating webs.

23. The method according to claim 1, wherein a) disturbing drops on the test surface are detected in the image of the test pattern applied to the test surface, b) the drop size of the disturbing drops is determined, and c) the correction values are determined as a function of the drop size.

24. The method according to claim 23, wherein a) it is determined from which nozzle of the applicator the disturbing drop was delivered by analyzing the image of the test pattern, and b) the opening time of the nozzle from which the disturbing drop was dispensed is corrected as a function of the drop size of the disturbing drop.

25. The method according to claim 1, wherein the image taken by the sensor comprises the complete test pattern and the deviation in the complete image is determined.

26. The method according to claim 1, wherein the image taken by the sensor comprises only a part of the test pattern, and the deviation is determined only in this part.

* * * * *